(12) United States Patent
Kim et al.

(10) Patent No.: US 11,718,188 B2
(45) Date of Patent: Aug. 8, 2023

(54) WIRELESS BATTERY MANAGEMENT SYSTEM AND BATTERY PACK INCLUDING SAME

(71) Applicant: LG ENERGY SOLUTION, LTD., Seoul (KR)

(72) Inventors: Ji-Eun Kim, Daejeon (KR); Chang-Hyun Sung, Daejeon (KR); Sang-Hoon Lee, Daejeon (KR); Yean-Sik Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 17/982,749

(22) Filed: Nov. 8, 2022

(65) Prior Publication Data

US 2023/0068623 A1 Mar. 2, 2023

Related U.S. Application Data

(63) Continuation of application No. 16/339,515, filed as application No. PCT/KR2018/006912 on Jun. 19, 2018, now Pat. No. 11,524,588.

(30) Foreign Application Priority Data

Jul. 19, 2017 (KR) .......... 10-2017-0091674

(51) Int. Cl.
*H01M 10/42* (2006.01)
*B60L 50/50* (2019.01)
(Continued)

(52) U.S. Cl.
CPC .......... *B60L 50/50* (2019.02); *H01M 10/425* (2013.01); *H01M 10/4207* (2013.01);
(Continued)

(58) Field of Classification Search
CPC .......... H01M 10/425; H01M 10/4207; H01M 10/482; H01M 2010/4271; H02J 7/00032; H02J 7/0048; H02J 7/0016; H02J 7/005
(Continued)

(56) References Cited

U.S. PATENT DOCUMENTS 6,611,774 B1 8/2003 Zaccaria
9,293,935 B2 * 3/2016 Lee .......................... H04Q 9/00
(Continued)

FOREIGN PATENT DOCUMENTS

CN 101752888 A 6/2010
CN 105576719 A 5/2016
(Continued)

OTHER PUBLICATIONS

International Search Report for PCT/KR2018/006912 (PCT/ISA/210) dated Oct. 5, 2018.
(Continued)

*Primary Examiner* — Nathaniel R Pelton
(74) *Attorney, Agent, or Firm* — Birch, Stewart, Kolasch & Birch, LLP

(57) ABSTRACT

A wireless battery management system includes a plurality of slave BMSs coupled to a plurality of battery modules in one-to-one correspondence. Each slave BMS is configured to operate in active mode and sleep mode. Each slave BMS is configured to wirelessly transmit a detection signal indicating a state of the battery module. The wireless battery management system further includes a master BMS configured to wirelessly receive the detection signal from each of the plurality of slave BMSs. The master BMS is configured to set a scan cycle and a scan duration for each of the plurality of slave BMSs based on the detection signal, and wirelessly transmit a control signal to the plurality of slave BMSs. The control signal includes a wireless balancing (Continued)

command indicating the scan cycle and the scan duration set for each of the plurality of slave BMSs.

20 Claims, 7 Drawing Sheets

(51) Int. Cl.
*H01M 10/48* (2006.01)
*H02J 7/00* (2006.01)
*B60L 58/12* (2019.01)

(52) U.S. Cl.
CPC ............ *H01M 10/482* (2013.01); *H02J 7/00* (2013.01); *H02J 7/0016* (2013.01); *H02J 7/00032* (2020.01); *H02J 7/0048* (2020.01); *B60L 58/12* (2019.02); *H01M 2010/4271* (2013.01); *H02J 7/005* (2020.01); *H02J 2310/48* (2020.01)

(58) Field of Classification Search
USPC .......................................................... 702/62
See application file for complete search history.

(56) References Cited

U.S. PATENT DOCUMENTS

| | | |
|---|---|---|
| 2007/0040657 A1 | 2/2007 | Foster et al. |
| 2008/0239628 A1 | 10/2008 | Tatebayashi |
| 2009/0066291 A1 | 3/2009 | Tien et al. |
| 2011/0148349 A1 | 6/2011 | Kim et al. |
| 2011/0316520 A1 | 12/2011 | Kawahara et al. |
| 2012/0165963 A1 | 6/2012 | Kim et al. |
| 2012/0274284 A1 | 11/2012 | Firehammer et al. |
| 2013/0162025 A1 | 6/2013 | Momose et al. |
| 2013/0271072 A1 | 10/2013 | Lee et al. |
| 2014/0266062 A1 | 9/2014 | Lee |
| 2014/0315048 A1 | 10/2014 | Yang |
| 2014/0347013 A1 | 11/2014 | Kim |
| 2015/0349550 A1 | 12/2015 | Jeon |
| 2016/0137091 A1 | 5/2016 | Yamazoe et al. |
| 2016/0233715 A1 | 8/2016 | Lee |
| 2016/0285284 A1 | 9/2016 | Matlapudi et al. |
| 2017/0054134 A1 | 2/2017 | Choi et al. |
| 2017/0237269 A1* | 8/2017 | Chang ................... H02J 7/0014 320/118 |
| 2017/0279725 A1 | 9/2017 | Lee et al. |
| 2017/0310128 A1 | 10/2017 | Cheng et al. |
| 2018/0012484 A1 | 1/2018 | Sakabe et al. |

FOREIGN PATENT DOCUMENTS

| | | |
|---|---|---|
| EP | 2 869 645 A1 | 5/2015 |
| JP | 2003-17134 A | 1/2003 |
| JP | 4013003 B2 | 11/2007 |
| JP | 2008-245480 A | 10/2008 |
| JP | 2009-038716 A | 2/2009 |
| JP | 2013-140055 A | 7/2013 |
| JP | 2013-541320 A | 11/2013 |
| JP | 2014-33604 A | 2/2014 |
| JP | 2016-91613 A | 5/2016 |
| JP | 2016-96623 A | 5/2016 |
| JP | 2016-143113 A | 8/2016 |
| KR | 10-0657649 B1 | 12/2008 |
| KR | 10-2011-0007860 A | 1/2011 |
| KR | 10-1309840-81 | 9/2011 |
| KR | 10-2012-0072224 A | 7/2012 |
| KR | 10-2014-0060169 A | 5/2014 |
| KR | 10-2014-0060801 A | 5/2014 |
| KR | 10-2014-0138067 A | 12/2014 |
| KR | 10-2015-0137675 A | 12/2015 |
| WO | WO 2012/017936 A1 | 2/2012 |

OTHER PUBLICATIONS

Kannan et al., "Energy and rate based MAC protocol for wireless sensor networks," Siqmod Record, ACM, vol. 32, No. 4, Dec. 2003, pp. 60-65.

Karthi et al., "Duty cycle adapted MAC for Wireless Sensor Networks with energy harvesting," 2015 International Conference on Control Communication & Computing India (ICCC), IEEE, Nov. 19-21, 2015, pp. 685-690.

Li et al., "An Efficient Energy Aware MAC Protocol for Wireless Sensor Network," 2010 International Conference on Multimedia Technoiooy, IEEE, Oct. 29, 2010, 4 pages.

Marín et al., "LL-MAC: A low latency MAC protocol for wireless self-organised networks," Microprocessors and Microsystems, vol. 32, No. 4, Jun. 1, 2008, pp. 197-209.

* cited by examiner

WIRELESS BATTERY MANAGEMENT SYSTEM AND BATTERY PACK INCLUDING SAME

CROSS-REFERENCE TO RELATED APPLICATIONS

This application is a Continuation of U.S. patent application Ser. No. 16/339,515 filed on Apr. 4, 2019, which is the National Phase of PCT International Application No. PCT/KR2018/006912 filed on Jun. 19, 2018, which claims priority under 35 U.S.C. 119(e) to Korean Patent Application No. 10-2017-0091674 filed in the Republic of Korea on Jul. 19, 2017, the entire contents of which are hereby expressly incorporated by reference into the present application.

TECHNICAL FIELD

The present disclosure relates to a wireless battery management system, and more particularly, to a wireless battery management system for reducing a residual capacity deviation between battery modules and a battery pack including the same.

BACKGROUND ART

Recently, there is dramatically growing demand for portable electronic products such as laptop computers, video cameras and mobile phones, and with the extensive development of electric vehicles, accumulators for energy storage, robots and satellites, many studies are being made on high performance secondary batteries that can be recharged repeatedly.

Currently, commercially available secondary batteries include nickel-cadmium batteries, nickel-hydrogen batteries, nickel-zinc batteries, lithium secondary batteries and the like, and among them, lithium secondary batteries have little or no memory effect, and thus they are gaining more attention than nickel-based secondary batteries for their advantages of free charging and discharging, a very low self-discharge rate and high energy density.

A battery pack applied to electric vehicles generally includes a plurality of battery modules connected in series and a plurality of battery management systems (BMSs). Each BMS monitors and controls the state of the battery module that the BMS manages. Recently, to meet the demand for high-capacity high-output battery packs, the number of battery modules included in a battery pack also increases. To efficiently manage the state of each battery module included in the battery pack, a single master-multi slave structure is disclosed. The single master-multi slave structure includes a plurality of slave BMSs installed in each battery module and a master BMS that controls the overall operation of the plurality of slave BMSs. In this instance, communication between the plurality of slave BMSs and the master BMS may be performed by a wireless method.

Each of the plurality of slave BMSs operates using electrical energy of the battery module in which the slave BMS is installed. Accordingly, when the battery pack is not in use or electrical energy of the battery pack is less than the threshold level, the plurality of slave BMSs operating in active mode goes into sleep mode according to the command of the master BMS. In sleep mode, a smaller amount of electrical energy is consumed than in active mode, and thus the discharge rate of the battery module reduces.

Each slave BMS switches back to active from sleep mode only when receiving a wakeup command from the master BMS. Accordingly, each slave BMS needs to check if the master BMS sends the wakeup command periodically or aperiodically even in sleep mode.

Meanwhile, due to the environment in which the battery pack operates or the electrical and chemical properties of the individual battery modules, a residual capacity deviation often occurs between the plurality of battery modules. To reduce the residual capacity deviation between the plurality of battery modules, balancing control is necessary. One of conventional technologies related to this is Patent Literature 1. Patent Literature 1 discloses reducing a charge capacity deviation between batteries included in a battery pack by controlling a balancing apparatus electrically connected between two ends of each battery when a BMS of the battery pack goes into sleep mode.

However, the conventional technologies including Patent Literature 1 have a limitation in the use of electrical energy of batteries because the electrical energy is not usefully utilized and just consumed away by balancing.

(Patent Literature 1) Korean Patent Publication No. 10-2014-0060169 (published May 19, 2014)

DISCLOSURE

Technical Problem

The present disclosure is directed to providing a wireless battery management system in which each slave BMS in sleep mode can perform the operation of scanning a wakeup command from a master BMS and the operation of balancing battery modules at the same time using electrical energy of each battery module in which each slave BMS is coupled, and a battery pack including the same.

These and other objects and advantages of the present disclosure will be understood by the following description and will be apparent from the embodiments of the present disclosure. Further, it will be readily understood that the objects and advantages of the present disclosure can be realized by the means set forth in the appended claims and combinations thereof.

Technical Solution

Various embodiments of the present disclosure for achieving the above-described object are as follows.

A wireless battery management system according to an aspect of the present disclosure includes a plurality of slave battery management systems (BMSs) coupled to a plurality of battery modules in one-to-one correspondence. Each slave BMS is configured to operate in an active mode and a sleep mode using power supplied from the battery module to which the slave BMS is coupled. Each slave BMS is further configured to wirelessly transmit a detection signal indicating a state of the battery module to which the slave BMS is coupled in the active mode. The wireless battery management system further includes a master BMS configured to wirelessly receive the detection signal from each of the plurality of slave BMSs. The master BMS is further configured to set a scan cycle and a scan duration for each of the plurality of slave BMSs based on the detection signal, and wirelessly transmit a control signal to each of the plurality of slave BMSs. The control signal includes a wireless balancing command indicating the scan cycle and the scan duration set for each of the plurality of slave BMSs.

Additionally, the master BMS may be configured to calculate a state of charge (SOC) of each of the plurality of battery modules based on the detection signal, and set the scan cycle and the scan duration for each of the plurality of slave BMSs based on the SOC of each of the plurality of battery modules.

Additionally, when the master BMS receives an operation stop command from a high-level controller, the master BMS may be configured to wirelessly transmit a first switching signal for inducing the switching from the active mode to the sleep mode to the plurality of slave BMSs.

Additionally, when the master BMS receives an operation start command from a high-level controller, the master BMS may be configured to wirelessly transmit a second switching signal for inducing the switching from sleep mode to the active mode to the plurality of slave BMSs in each preset cycle.

Additionally, each of the plurality of slave BMS may be configured to wirelessly scan the second switching signal in the sleep mode using the power supplied from the battery module to which the slave BMS is coupled for the scan duration set to the slave BMS in each scan cycle set for the slave BMS based on the wireless balancing command included in the control signal.

Additionally, each of the plurality of slave BMSs may be configured to switch from the sleep mode to the active mode when the slave BMS succeeds in scanning the second switching signal in the sleep mode.

Additionally, each of the plurality of slave BMSs may be configured to wirelessly transmit a response signal to the master BMS when the slave BMS succeeds in scanning the second switching signal in the sleep mode, the response signal notifying that the slave BMS has succeeded in scanning the second switching signal.

Additionally, each of the plurality of slave BMSs may be configured to wirelessly transmit the response signal to the master BMS at a time point where a delay time corresponding to an ID allocated to the slave BMS has elapsed from a time point when the scanning of the second switching signal has succeeded.

Each time the master BMS receives the response signal from each of the plurality of slave BMSs, the master BMS may be configured to shorten the preset cycle by a predetermined value or a predetermined percentage.

The master BMS may be configured to set the slave BMS coupled to the battery module having a highest SOC among the plurality of battery modules as a representative slave BMS. In this case, the control signal may further include a setting command for assigning the representative slave BMS.

Additionally, in the sleep mode, the representative slave BMS may be configured to generate a sync signal based on the setting command, and wirelessly transmit the sync signal to the other slave BMSs.

Advantageous Effects

According to at least one of the embodiments of the present disclosure, each slave BMS in sleep mode can scan a wakeup command from the master BMS using electrical energy of each battery module in which each slave BMS is coupled. Accordingly, it is possible to balance battery modules with no addition of a separate circuitry for reducing a residual capacity deviation between the battery modules.

Additionally, according to at least one of the embodiments of the present disclosure, each slave BMS adjusts the values of each parameter related to wakeup command scanning according to the residual capacity of the battery module in which the slave BMS is coupled, thereby contributing to the rapid balancing with preventing the overdischarge of the battery modules.

Additionally, according to at least one of the embodiments of the present disclosure, the master BMS reduces the wakeup command transmission cycle each time each slave BMS succeeds in scanning the wakeup command to induce any slave BMS having not yet succeeded in scanning the wakeup command to go into active mode quickly.

The effects of the present disclosure are not limited to the above-mentioned effects, and other effects not mentioned herein will be clearly understood by those skilled in the art from the appended claims.

BRIEF DESCRIPTION OF THE DRAWINGS

The accompanying drawings illustrate a preferred embodiment of the present disclosure, and together with the detailed description of the present disclosure described below, serve to provide a further understanding of the technical aspects of the present disclosure, and thus, the present disclosure should not be construed as being limited to the drawings.

MODE FOR CARRYING OUT THE INVENTION

Figure 1:
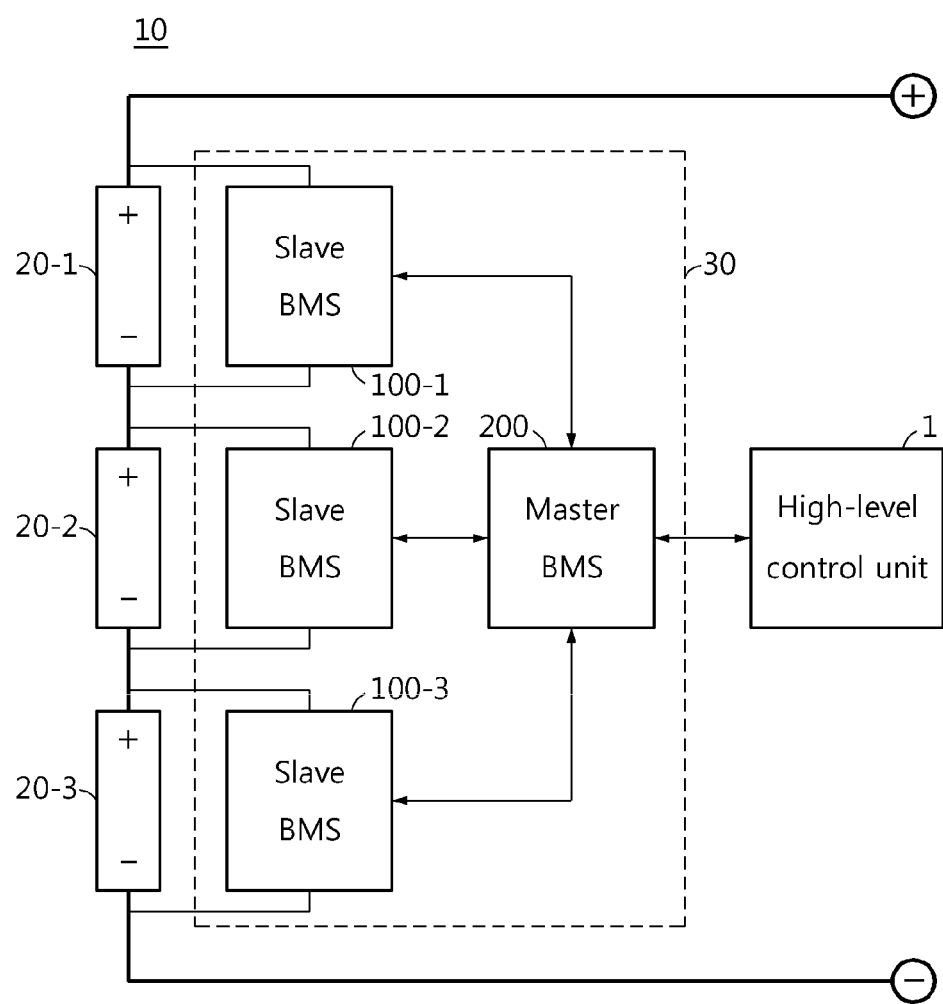
FIG. 1 is a schematic diagram showing configuration of a wireless battery management system according to an embodiment of the present disclosure and a battery pack including the same.

Hereinafter, the preferred embodiments of the present disclosure will be described in detail with reference to the accompanying drawings. Prior to the description, it should be understood that the terms or words used in the specification and the appended claims should not be construed as being limited to general and dictionary meanings, but interpreted based on the meanings and concepts corresponding to the technical aspects of the present disclosure on the basis of the principle that the inventor is allowed to define the terms appropriately for the best explanation.

Therefore, the embodiments described herein and illustrations shown in the drawings are just a most preferred embodiment of the present disclosure, but not intended to fully describe the technical aspects of the present disclosure, so it should be understood that a variety of other equivalents and modifications could be made thereto at the time of filing the application.

Additionally, in describing the present disclosure, when it is deemed that a certain detailed description of relevant known elements or functions renders the key subject matter of the present disclosure ambiguous, the detailed description is omitted herein.

The terms including the ordinal number such as "first", "second" and the like, may be used to distinguish one element from another among various elements, but not intended to limit the elements by the terms.

Unless the context clearly indicates otherwise, it will be understood that the term "comprises" or "includes" when used in this specification, specifies the presence of stated elements, but does not preclude the presence or addition of one or more other elements. Additionally, the term <control unit> as used herein refers to a processing unit of at least one function or operation, and this may be implemented by hardware or software alone or in combination.

In addition, throughout the specification, it will be further understood that when an element is referred to as being "connected to" another element, it can be directly connected to the other element or intervening elements may be present.

It should be noted that "BMS" as used herein is a shorted form of Battery Management System.

FIG. 1 is a schematic diagram showing configuration of a wireless battery management system 30 according to an embodiment of the present disclosure and a battery pack 10 including the same.

Referring to FIG. 1, the battery pack 10 includes a plurality of battery modules 20 and a wireless battery management system 30. Each battery module 20 may include at least one battery cell (see 21 in FIG. 2). The wireless battery management system 30 includes a plurality of slave BMSs 100 and at least one master BMS 200. The battery pack 10 may be mounted in an electric vehicle to supply power required for operating an electric motor of the electric vehicle.

Hereinafter, for convenience of description, assume that the battery pack 10 includes three battery modules 20-1~20-3, and the wireless battery management system 30 includes three slave BMSs 100-1~100-3 and a single master BMS 200. However, the scope of the present disclosure is not limited thereto. For example, the battery pack 10 may include only two battery modules 20 or four or more battery modules 20. Of course, the wireless battery management system 30 may include two slave BMSs 100 or four or more slave BMSs 100, and may include two or more master BMSs 200.

The plurality of slave BMSs 100-1~100-3 is coupled in one-to-one correspondence to the plurality of battery modules 20-1~20-3 included in the battery pack 10.

Each of the plurality of slave BMSs 100-1~100-3 is electrically connected to one of the plurality of battery modules 20 in which the corresponding slave BMS 100 is coupled. Each of the plurality of slave BMSs 100-1~100-3 detects the overall state (for example, voltage, current, temperature) of the battery module 20 electrically connected to the corresponding slave BMS 100, and performs a variety of control functions (for example, charging, discharging, balancing) to adjust the state of the battery module 20. Each control function may be performed directly by the slave BMS 100 based on the state of the battery module 20, or may be performed according to the command from the master BMS 200.

Figure 2:
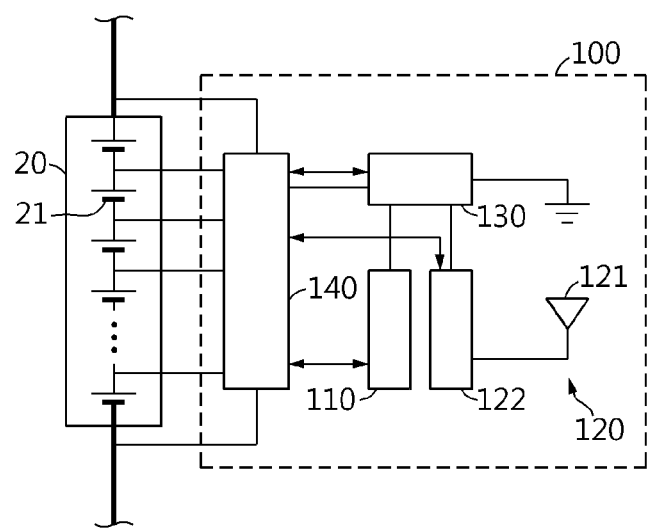
FIG. 2 is a schematic diagram showing configuration of a slave BMS shown in FIG. 1.

FIG. 2 is a schematic diagram showing configuration of the slave BMS 100 shown in FIG. 1.

Referring to FIG. 2, each slave BMS 100 may include a slave memory 110, a slave communication unit 120, a slave power supply unit 130 and a slave control unit 140.

The slave memory 110 stores an ID allocated to the slave BMS. The temporary ID may be allocated in the manufacture of the slave BMS 100 including the slave memory 110. The ID may be used for each of the plurality of slave BMSs 100 to perform wireless communication with the master BMS 200. In this instance, the ID allocated to one of the plurality of slave BMSs 100 may be different from the IDs allocated to the other slave BMSs 100.

Each ID may be used for the master BMS 200 to distinguish each slave BMS 100 (e.g. 100-1) from the other slave BMS 100 (e.g. 100-2). Additionally, each ID may represent which of the plurality of battery modules 20 at which the slave BMS 100 with the allocated ID is installed.

The slave memory 110 is not limited to a particular type and includes any known information storage means capable of recording, deleting, updating and reading data. For example, the slave memory 110 may be DRAM, SDRAM, the flash memory 120, ROM, EEPROM and a register. The slave memory 110 may store program codes defining the processes that can be executed by the slave control unit 140.

The slave memory 110 may be physically separated from the slave control unit 140, or may be integrated into a chip with the slave control unit 140.

The slave communication unit 120 includes a slave antenna 121 and a slave communication circuit 122. The slave antenna 121 and the slave communication circuit 122 are operably connected to each other. The slave communication circuit 122 demodulates a wireless signal received by the slave antenna 121. Additionally, the slave communication circuit 122 may modulate a signal provided from the slave control unit 140 and provide it to the slave antenna 121. The slave antenna 121 may transmit a wireless signal corresponding to the signal modulated by the slave communication circuit 122 to the other slave BMS or the master BMS 200 simultaneously or selectively.

The slave power supply unit 130 generates at least one preset level of power source voltage using the power supplied from the battery module 20. The power source voltage generated by the slave power supply unit 130 may be individually supplied to the slave memory 110 and the slave communication unit 120. Additionally, the power source voltage generated by the slave power supply unit 130 may be supplied to each processor included in the slave control unit 140. For example, first power source voltage generated by the slave power supply unit 130 may be used as the operating power of each processor included in the slave control unit 140, and second power source voltage generated by the slave power supply unit 130 may be used as the operating power of each of the slave memory 110 and the slave communication unit 120.

The slave control unit 140 includes at least one processor, and is operably connected to the slave memory 110, the slave communication unit 120 and the slave power supply unit 130. The slave control unit 140 is configured to manage the overall operation of the slave BMS 100 including the slave control unit 160.

The slave control unit 140 may include a sensing unit configured to detect the state of the battery module 20. For example, the sensing unit may include a voltage measurement circuit to detect the voltage of the battery module 20, a current measurement circuit to detect the current of the battery module 20, or a temperature detection circuit to detect the temperature of the battery module 20. The slave control unit 140 provides sensing information indicating the detected state of the battery module 20 to the slave communication unit 120. Then, the slave communication unit 120 transmits a wireless signal corresponding to the sensing information to the master BMS 200 through the slave antenna 121.

Each processor included in the slave control unit 140 may selectively include a processor, an application-specific integrated circuit (ASIC), a chipset, a logic circuit, a register, a communication modem and a data processing device known in the art to execute various control logics. At least one of the various control logics of the slave control unit 140 may be combined, and the combined control logics may be written in computer-readable code system and recorded in computer-readable recording media. The recording media is not limited to a particular type and includes any type that can be accessed by a processor included in a computer. For example, the recording media includes at least one selected from the group consisting of ROM, RAM, a register, CD-ROM, a magnetic tape, a hard disk, a floppy disk and an optical data recording device. Additionally, the code system may be modulated to a carrier signal and included in a communication carrier at a particular time point and may be stored and executed in computers connected via a network in distributed manner. Additionally, functional programs, codes and code segments for implementing the combined control logics may be readily inferred by programmers in the technical field to which the present disclosure belongs.

Figure 3:
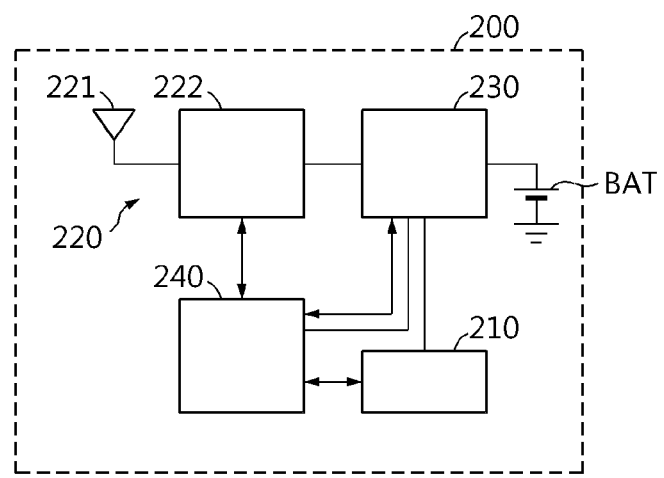
FIG. 3 is a schematic diagram showing configuration of a master BMS shown in FIG. 1.

FIG. 3 is a schematic diagram showing configuration of the master BMS 200 shown in FIG. 1.

Referring to FIG. 3, the master BMS 200 may include a master memory 210, a master communication unit 220, a master power supply unit 230 and a master control unit 240.

The master memory 210 may store an ID table. The ID table includes each ID allocated to the plurality of slave BMSs 100-1~100-3.

The master memory 210 is not limited to a particular type and includes any known information storage means capable of recording, deleting, updating and reading data. For example, the master memory 210 may be DRAM, SDRAM, the flash memory 120, ROM, EEPROM and a register. The master memory 210 may store program codes defining the processes that can be executed by the slave control unit 140.

The master memory 210 may be physically separated from the master control unit 240, and may be integrated into a chip with the master control unit 240.

The master communication unit 220 includes a master antenna 221 and a master communication circuit 222. The master antenna 221 and the master communication circuit 222 are operably connected to each other. The master communication circuit 222 may demodulate a wireless signal received through the master antenna 221. Additionally, the master communication circuit 222 may modulate a signal to transmit to each slave BMS 100, and transmit the modulated signal wirelessly through the master antenna 222. The master antenna 222 may selectively transmit a wireless signal corresponding to the signal modulated by the master communication unit 220 to at least one of the plurality of slave BMSs 100-1~100-3.

The master power supply unit 230 generates at least one power source voltage using electrical energy supplied from at least one battery module 20, an external power source or its own power source (BAT). The power source voltage generated by the master power supply unit 230 may be supplied to the master memory 210 and the master communication unit 220. Additionally, the power source voltage generated by the master power supply unit 230 may be supplied to each processor included in the master control unit 240.

The master control unit 240 includes at least one processor, and is operably connected to the master memory 210 and the master communication unit 220. The master control unit 240 is configured to manage the overall operation of the master BMS 200. Additionally, the master control unit 240 may calculate the State Of Charge (SOC) and/or State Of Health (SOH) of each of the battery modules 20-1~20-3 based on the wireless signal corresponding to the sensing information of each of the plurality of slave BMSs 100-1~100-3 among the wireless signals received through the master antenna 221. Additionally, the master control unit 240 may generate information for controlling the charging, discharging and/or balancing of each of the plurality of slave BMSs 100-1~100-3 based on the calculated SOC and/or SOH, and selectively transmit it to at least one of the plurality of slave BMSs 100-1~100-3 through the master antenna 221 and the master communication unit 220.

Each processor included in the master control unit 240 may selectively include a processor, an application-specific integrated circuit (ASIC), a chipset, a logic circuit, a register, a communication modem and a data processing device known in the art to execute various control logics. At least one of the various control logics of the master control unit 240 may be combined, and the combined control logics may be written in computer-readable code system and recorded in computer-readable recording media. The recording media is not limited to a particular type and includes any type that can be accessed by a processor included in a computer. For example, the recording media includes at least one selected from the group consisting of ROM, RAM, a register, CD-ROM, a magnetic tape, a hard disk, a floppy disk and an optical data recording device. Additionally, the code system may be modulated to a carrier signal and included in a communication carrier at a particular time point and may be stored and executed in computers connected via a network in distributed manner. Additionally, functional programs, codes and code segments for implementing the combined control logics may be readily inferred by programmers in the technical field to which the present disclosure belongs.

Each slave BMS 100 may selectively operate in active mode, sleep mode and shutdown mode. In the present disclosure, the active mode refers to a mode that is activated in a situation in which the battery module 20 is being charged/discharged (for example, an ignition ON state of an electric vehicle). In the active mode, each slave BMS 100 may execute all functions for managing the state the battery module 20 without limitation by continuously using the power supplied from the battery module 20.

In the present disclosure, the sleep mode refers to a mode that is activated in a situation in which the battery module 20 is not in failure state (for example, overdischarge), but is not charged/discharged (for example, an ignition OFF state of an electric vehicle). In the sleep mode, each slave BMS 100 may execute only limited function using the power supplied from the battery module 20 only for the period of time during which a preset condition is satisfied.

In the present disclosure, the shutdown mode refers to a mode in which the execution of all functions requiring the power supplied from the battery module 20 is stopped as the battery module 20 is placed in the failure state.

When the master BMS 200 receives an operation stop command from a high-level control unit 1 of the device (for example, the electric vehicle) in which the battery pack 10 is mounted, the master BMS 200 wirelessly transmits a first switching signal to the plurality of slave BMSs. For example, when the ignition state of the electric vehicle is changed from the On state to the Off state, the high-level control unit 1 may output the operation stop command to the master BMS 200. The first switching signal may be a signal for inducing each slave BMS to switch from the active mode to the sleep mode.

When the master BMS 200 receives an operation start command from the high-level control unit 1, the master BMS 200 wirelessly transmits a second switching signal to the plurality of slave BMSs. The second switching signal is a sort of wakeup command. For example, when the ignition state of the electric vehicle is changed from the Off state to the On state, the high-level control unit 1 may output the operation start command to the master BMS. The second switching signal may be a signal for inducing each slave BMS to switch from the sleep mode to the active mode.

In active mode, each slave BMS 100 is configured to detect the state of the battery module 20 in which the slave BMS 100 is coupled, and wirelessly transmit a detection signal indicating the detected state to the master BMS 200, in each predetermined cycle or in response to each request from the master BMS 200. The master BMS 200 wirelessly receives the detection signal from each of the plurality of slave BMSs 100-1~100-3, and calculates the States Of Charge (SOC) of each of the plurality of battery modules 20-1~20-3 based on each of the received detection signals. The SOC indicates the residual capacity of the corresponding battery module 20.

Subsequently, the master BMS 200 sets a scan cycle and a scan duration for each of the plurality of slave BMSs 100-1~100-3 based on the SOC of each of the plurality of battery modules 20-1~20-3. In this instance, there is a relationship 'scan cycle≥scan duration'.

The master BMS 200 may store the scan cycle and the scan duration set for each of the plurality of slave BMSs 100-1~100-3 in the master memory 210.

According to one implementation example, the scan durations set to the plurality of slave BMSs 100-1~100-3 may equal, and the scan cycle that is inversely proportional to the SOC of the battery module 20 in which the corresponding slave BMS 100 is coupled may be set to the corresponding slave BMS 100. For example, the scan cycle set to one slave BMS 100 may be an integer multiple of the scan cycle set to at least one of the other slave BMSs 100.

According to another implementation example, the scan cycles set the plurality of slave BMSs 100-1~100-3 may be equal, and the scan duration that is proportional to the SOC of the battery module 20 in which the corresponding slave BMS 100 is coupled may be set to the corresponding slave BMS 100. For example, the scan duration of 3 sec may be set to the slave BMS 100 coupled to the battery module 20 with SOC=70%, and the scan duration of 2 sec may be set to the slave BMS 100 coupled to the battery module 20 with SOC=50%.

According to still another implementation example, the scan cycle and the scan duration set to one slave BMS 100 may be each different from the scan cycle and the scan duration set to the other slave BMS 100.

Of course, when a deviation in SOC between the battery modules 20-1~20-3 is in a preset error range, the same scan cycle and the same scan duration may be set to the plurality of slave BMSs 100-1~100-3.

The master BMS 200 generates a wireless balancing command indicating the scan cycle and the scan duration set for each of the plurality of slave BMSs 100-1~100-3 based on the detection signals wirelessly received from the plurality of slave BMSs 100-1~100-3. Additionally, the master BMS 200 wirelessly transmits a control signal including the generated wireless balancing command to the plurality of slave BMSs 100-1~100-3. The control signal may be wirelessly transmitted to the plurality of slave BMSs 100-1~100-3 at the same time with the first switching signal or before transmission of the first switching signal.

Each of the plurality of slave BMSs 100-1~100-3 wirelessly receives the control signal from the master BMS 200. Additionally, each of the plurality of slave BMSs 100-1~100-3 may store the scan cycle and the scan duration set to itself in its slave memory 110 according to the wireless balancing command included in the received control signal.

When the plurality of slave BMSs 100-1~100-3 goes into the sleep mode in response to the first switching signal, the slave control unit 140 of each of the plurality of slave BMSs 100-1~100-3 outputs a scanning pulse signal corresponding to the scan cycle and scan duration set by the control signal received last before going into the sleep mode to the slave communication unit 130. For example, the scanning pulse signal is a signal with a repetition of rising edges and falling edges, in which the time from one rising edge to the next rising edge may be equal to the scan cycle, and the time from one rising edge to the next falling edge may be equal to the scan duration.

In response to the scanning pulse signal from the slave control unit 140, the slave communication circuit 122 may scan the second switching signal from the master BMS 200 through the slave antenna 121. More specifically, the slave communication circuit 122 may wirelessly scan the presence or absence of the second switching signal through the slave antenna 121 using the operating power from the slave power supply unit 130 during the time from the rising edge to the next falling edge in the scanning pulse signal outputted to the slave communication circuit 122. In contrast, the slave communication circuit 122 may stop scanning the second switching signal during the time from the falling edge to the next rising edge in the scanning pulse signal outputted to the slave communication circuit 122.

The following is a detailed description of each of the embodiments in which the master BMS 200 reduces a residual capacity deviation between the plurality of battery modules 20-1~20-3 by controlling the plurality of slave BMSs 100-1~100-3.

For convenience of description, assume that the SOC of the battery module 20-1 in which the first slave BMS 100-1 is coupled is the highest, the SOC of the battery module 20-2 in which the second slave BMS 100-2 is coupled is the second highest, and the SOC of the battery module 20-3 in which the third slave BMS 100-3 is coupled is the lowest.

Figure 4:
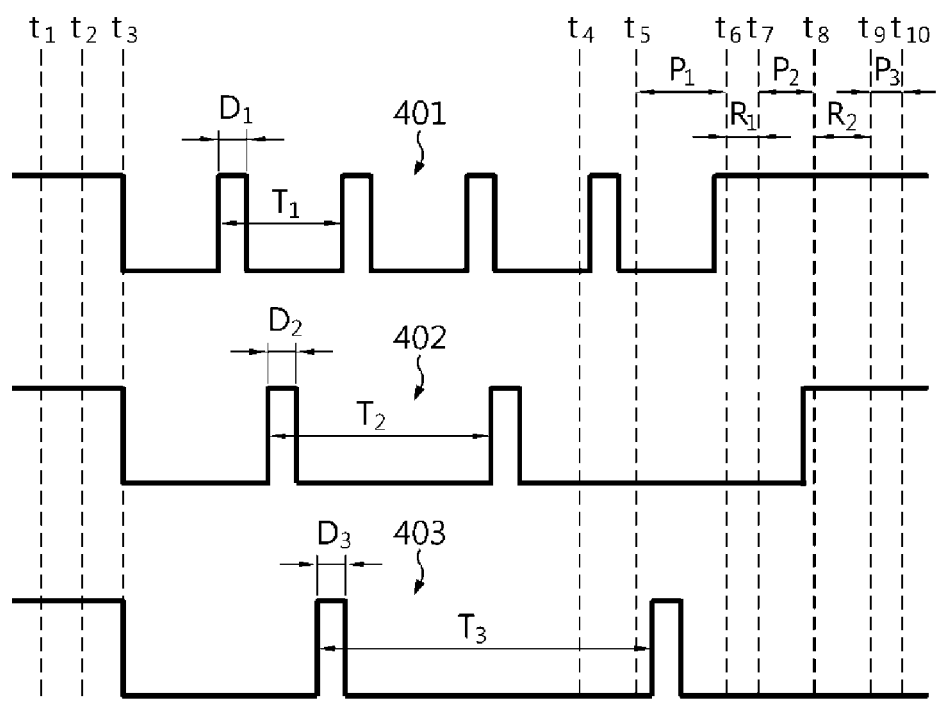
FIG. 4 is a timing chart for reference in describing the operation of reducing a residual capacity deviation between a plurality of battery modules by a wireless battery management system according to an embodiment of the present disclosure.

FIG. 4 is a timing chart for reference in describing the operation of reducing a residual capacity deviation between the plurality of battery modules 20-1~20-3 by the wireless battery management system according to an embodiment of the present disclosure.

Referring to FIG. 4, at the time point $t_1$, the high-level control unit 1 outputs an operation stop command to the master BMS 200. At the time point $t_2$, the master BMS 200 wirelessly transmits a first switching signal to the plurality of slave BMSs 100-1~100-3 in active mode in response to the operation stop command. Because all the first to third slave BMSs 100-1~100-3 operate in active mode, they may receive the first switching signal normally even though the master BMS 200 transmits the first switching signal only once. From the time point $t_3$, the first to third slave BMSs 100-1~100-3 operates in sleep mode in response to the first switching signal.

Before the time point $t_3$ (for example, $t_2$), the master BMS 200 may set the scan cycle and the scan duration of each of the first to third slave BMSs 100-1~100-3 by wirelessly transmitting a control signal. The control signal may be based on the detection signal received last by the master BMS 200 from the plurality of slave BMSs 100-1~100-3 before the time point $t_1$.

After the time point $t_3$, the slave control unit 140 of the first slave BMS 100-1 outputs a first scanning pulse signal 401 to the slave communication circuit 122 of the first slave BMS 100-1. The first scanning pulse signal 401 is defined by a first scan cycle $T_1$ and a first scan duration $D_1$.

After the time point $t_3$, the slave control unit 140 of the second slave BMS 100-2 outputs a second scanning pulse signal 402 to the slave communication circuit 122 of the second slave BMS 100-2. The second scanning pulse signal 402 is defined by a second scan cycle $T_2$ and a second scan duration Dz.

After the time point $t_3$, the slave control unit 140 of the third slave BMS 100-3 outputs a third scanning pulse signal 403 to the slave communication circuit 122 of the third slave BMS 100-3. The third scanning pulse signal 403 is defined by a third scan cycle $T_3$ and a third scan duration $D_3$.

Assume that the master BMS 200 sets different scan cycles and the same scan duration to the first to third slave BMSs 100-1~100-3. In this case, $D_1=D_2=D_3$, $T_3>T_2>T_1$. Accordingly, the first slave BMS 100-1 uses more energy in scanning the second switching signal than the second and third slave BMSs 100-2, 100-3. As a result, the SOC of the first battery module 20-1 in which the first slave BMS 100-1 is coupled decreases faster than the SOC of the second and third battery modules 20-2, 20-3. Likewise, the SOC of the second battery module 20-2 in which the second slave BMS 100-2 is coupled decreases faster than the SOC of the third battery module 20-3.

At the time point $t_4$ when the first to third slave BMSs 100-1~100-3 is scanning the presence of the second switching signal using the first to third scanning pulse signals 401, 402, 403, the high-level control unit 1 outputs an operation start command to the master BMS 200.

In response to the operation start command, from the time point $t_5$, the master BMS 200 wirelessly transmits the second switching signal in each preset cycle $P_1$. At the time point $t_5$, all the first to third scanning pulse signals 401, 402, 403 have a preset low level, and thus, all the first to third slave BMSs 100-1~100-3 fail to scan the second switching signal transmitted at the time point $t_5$. Accordingly, any of the first to third slave BMSs 100-1~100-3 does not transmit a response signal to the master BMS 200.

At the time point $t_6$ where $P_1$ has elapsed since the time point $t_5$, the master BMS 200 wirelessly transmits the second switching signal again. At the time point $t_6$, the first scanning pulse signal 401 has a preset high level dissimilar to the second and third scanning pulse signals 402, 403, and thus the first slave BMS 100-1 succeeds in scanning the second switching signal earlier than the second and third slave BMSs 100-2, 100-3.

Accordingly, from the time point $t_6$, the first slave BMS 100-1 switches from the sleep mode to the active mode and operates in active mode. Additionally, at the time point $t_7$, the first slave BMS 100-1 wirelessly transmits the response signal notifying that the scanning of the second switching signal has succeeded to the master BMS 200. In this instance, the time point $t_7$ may be the time point where a delay time $R_1$ corresponding to the ID of the first slave BMS 100-1 has elapsed since the time point $t_6$.

The master BMS 200 may shorten the preset cycle $P_1$ based on the response signal from the first slave BMS 100-1. Preferably, each time the master BMS 200 receives the response signal from each slave BMS 100, the master BMS 200 may shorten the latest preset cycle $P_1$ by a predetermined value or a predetermined percentage. For example, as shown in FIG. 4, after the time point $t_7$, the master BMS 200 may wirelessly transmit the second switching signal in each new preset cycle $P_2$ instead of the preset cycle $P_1$.

At the time point $t_8$ where the preset cycle $P_2$ has elapsed since the time point $t_7$ when the master BMS 200 transmitted the second switching signal last, the master BMS 200 wirelessly transmits the second switching signal. At the time point $t_8$, the second scanning pulse signal 402 has a preset high level dissimilar to the third scanning pulse signal 403, and thus the second slave BMS 100-2 succeeds in scanning the second switching signal earlier than the third slave BMS 100-3.

Accordingly, from the time point $t_8$, the second slave BMS 100-2 switches from the sleep mode to the active mode and operates in active mode. Additionally, at the time point $t_9$, the second slave BMS 100-2 wirelessly transmits the response signal notifying that the scanning of the second switching signal has succeeded to the master BMS 200. In this instance, the time point $t_9$ may be the time point where a delay time $R_2$ corresponding to the ID of the second slave BMS 100-2 has elapsed since the time point $t_8$. Because the IDs of the first and second slave BMSs 100-1, 100-2 are different, the delay time $R_1$ and the delay time $R_2$ may be also different.

The master BMS 200 may shorten the preset cycle $P_2$ based on the response signal from the second slave BMS 100-2. For example, as shown in FIG. 4, after the time point $t_9$, the master BMS 200 may wirelessly transmit the second switching signal in each new preset cycle $P_3$. The preset cycle $P_3$ may be shorter than the third scan duration $D_3$ set to the third slave BMS 100-3 still operating in sleep mode.

Although not shown, the master BMS 200 wirelessly transmits the second switching signal in each preset cycle $P_3$ that is shorter than the third scan cycle $T_3$, and accordingly, the third slave BMS 100-3 will succeed in scanning the second switching signal and switch to the active mode at an arbitrary time point after the time point $t_{10}$. Additionally, the third slave BMS 100-3 will wirelessly transmit the response signal notifying that the scanning of the second switching signal has succeeded to the master BMS 200 at the time point where a delay time corresponding to its ID has elapsed since the time point when the scanning of the second switching signal succeeded.

When the master BMS 200 wirelessly receives the response signal from all the slave BMSs 100-1~100-3 included in the wireless battery management system 30, the master BMS 200 may stop the wireless transmission of the second switching signal.

Figure 5:
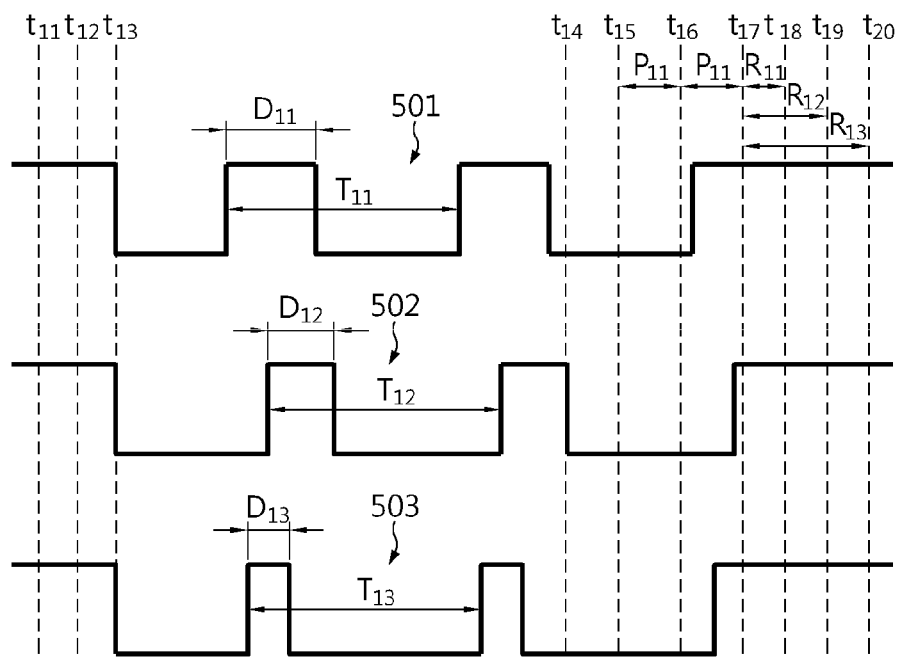
FIG. 5 is a timing chart for reference in describing the operation of reducing a residual capacity deviation between a plurality of battery modules by a wireless battery management system according to another embodiment of the present disclosure.

FIG. 5 is a timing chart for reference in describing the operation of reducing a residual capacity deviation between the plurality of battery modules 20-1~20-3 by the wireless battery management system according to another embodiment of the present disclosure.

Referring to FIG. 5, at the time point $t_{11}$, the high-level control unit 1 outputs an operation stop command to the master BMS 200. At the time point $t_{12}$, the master BMS 200 wirelessly transmits a first switching signal to the plurality of slave BMSs 100-1~100-3 in active mode in response to the operation stop command. Because all the first to third slave BMSs 100-1~100-3 operate in the active mode, they may receive the first switching signal normally even though the master BMS 200 transmits the first switching signal only once. From the time point $t_{13}$, the first to third slave BMSs 100-1~100-3 operates in the sleep mode in response to the first switching signal.

Before the time point $t_{13}$ (for example, $t_{12}$), the master BMS 200 may set the scan cycle and the scan duration of each of the first to third slave BMSs 100-1~100-3 by wirelessly transmitting a control signal. The control signal may be based on the detection signal received last by the master BMS 200 from the plurality of slave BMSs 100-1~100-3 before the time point $t_{11}$.

After the time point $t_{13}$, the slave control unit 140 of the first slave BMS 100-1 outputs a first scanning pulse signal 501 to the slave communication circuit 122 of the first slave BMS 100-1. The first scanning pulse signal 501 is defined by a first scan cycle $T_{11}$ and a first scan duration $D_{11}$. After the time point $t_{13}$, the slave control unit 140 of the second slave BMS 100-2 outputs a second scanning pulse signal 502 to the slave communication circuit 122 of the second slave BMS 100-2. The second scanning pulse signal 502 is defined by a second scan cycle $T_{12}$ and a second scan duration $D_{12}$. After the time point $t_{13}$, the slave control unit 140 of the third slave BMS 100-3 outputs a third scanning pulse signal 503 to the slave communication circuit 122 of the third slave BMS 100-3. The third scanning pulse signal 503 is defined by a third scan cycle $T_{13}$ and a third scan duration $D_{13}$.

Dissimilar to the embodiment described above with reference to FIG. 4, assume that the master BMS 200 sets the same scan cycle and different scan durations to the first to third slave BMSs 100-1~100-3. In this case, $D_{11} > D_{12} > D_{13}$, $T_{11} = T_{12} = T_{13}$. Accordingly, the first slave BMS 100-1 uses more energy in scanning the second switching signal than the second and third slave BMSs 100-2, 100-3. As a result, similar to the situation described above with reference to FIG. 4, the SOC of the first battery module 20-1 in which the first slave BMS 100-1 is coupled decreases faster than the SOC of the second and third battery modules 20-2, 20-3. Likewise, the SOC of the second battery module 20-2 in which the second slave BMS 100-2 is coupled decreases faster than the SOC of the third battery module 20-3.

At the time point $t_{14}$ when the first to third slave BMSs 100-1~100-3 is scanning the presence of the second switching signal using the first to third scanning pulse signals 501, 502, 503, the high-level control unit 1 outputs an operation start command to the master BMS 200.

In response to the operation start command, from the time point tis, the master BMS 200 wirelessly transmits the second switching signal in each preset cycle $P_{11}$. At the time point tis, all the first to third scanning pulse signals 501, 502, 503 have a preset low level, and thus all the first to third slave BMSs 100-1~100-3 fail to scan the second switching signal transmitted at the time point tis. Accordingly, none of the first to third slave BMSs transmits a response signal to the master BMS 200.

At the time point $t_{16}$ where a preset cycle Pu has elapsed since the time point tis, the master BMS 200 wirelessly transmits the second switching signal again. However, likewise, at the time point $t_{16}$, all the first to third scanning pulse signals 501, 502, 503 have the preset low level, and thus all the first to third slave BMSs 100-1~100-3 fail to scan the second switching signal transmitted at the time point $t_{16}$. Accordingly, none of the first to third slave BMSs 100-1~100-3 transmits the response signal to the master BMS 200.

At the time point $t_{17}$ where the preset cycle $P_{11}$ has elapsed since the time point $t_{16}$, the master BMS 200 wirelessly transmits the second switching signal again. At the time point $t_{17}$, the first to third scanning pulse signals 501, 502, 503 have all high levels, and thus the first to third slave BMSs 100-1~100-3 all succeed in scanning the second switching signal.

Accordingly, from the time point $t_{17}$, each of the first to third slave BMSs 100-1~100-3 switches from the sleep mode to the active mode and operates in the active mode.

Meanwhile, at the time point $t_{18}$ where a delay time $R_{11}$ corresponding to the ID of the first slave BMS 100-1 has elapsed since the time point $t_{17}$, the first slave BMS 100-1 wirelessly transmits the response signal notifying that the scanning of the second switching signal has succeeded to the master BMS 200.

Additionally, at the time point $t_{19}$ where a delay time $R_{12}$ corresponding to the ID of the second slave BMS 100-2 has elapsed since the time point $t_{17}$, the second slave BMS 100-2 wirelessly transmits the response signal notifying that the scanning of the second switching signal has succeeded to the master BMS 200. Because the IDs of the first and second slave BMSs 100-1, 100-2 are different, the delay time $R_{11}$ and the delay time $R_{12}$ may be also different.

Additionally, at the time point $t_{20}$ where a delay time $R_{13}$ corresponding to the ID of the third slave BMS 100-3 has elapsed since the time point $t_{17}$, the third slave BMS 100-3 wirelessly transmits the response signal notifying that the scanning of the second switching signal has succeeded to the master BMS 200. Because the IDs of the first to third slave BMSs 100-1~100-3 are different, the delay time $R_{13}$ may be different from the delay time $R_{11}$ and the delay time $R_{12}$.

When the master BMS 200 wirelessly receives the response signal from all the slave BMSs 100-1~100-3 included in the wireless battery management system 30, the master BMS 200 may stop the wireless transmission of the second switching signal.

Meanwhile, as described above, even though two or more slave BMSs 100 succeed in scanning the second switching signal at the same time point, each slave BMS 100 wirelessly transmits the response signal at different time points from the other slave BMS 100, thereby reducing a signal interference phenomenon that occurs when several response signals are wirelessly transmitted to the master BMS 200 at the same time.

Figure 6:
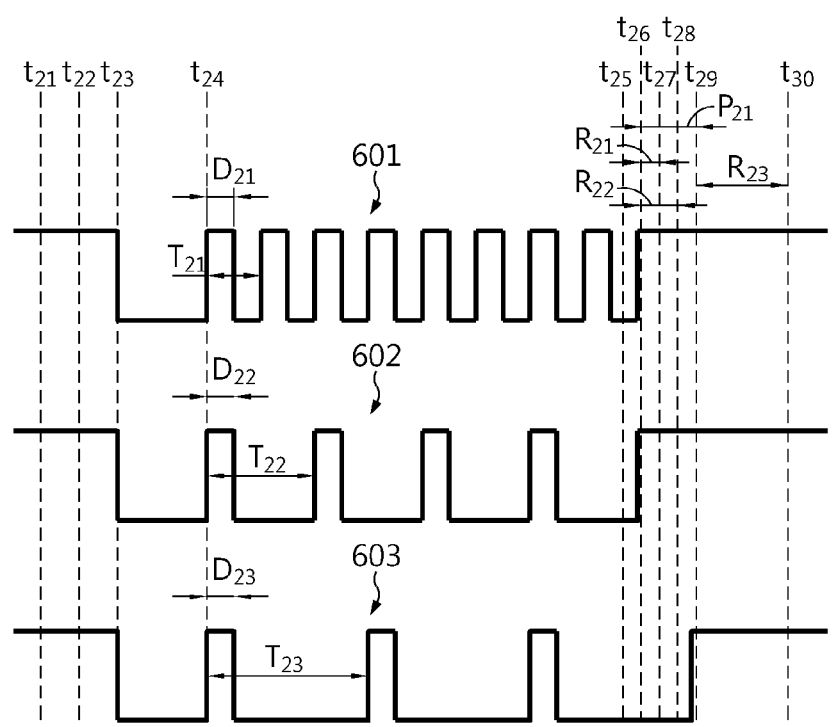
FIG. 6 is a timing chart for reference in describing the operation of reducing a residual capacity deviation between a plurality of battery modules by a wireless battery management system according to still another embodiment of the present disclosure.

FIG. 6 is a timing chart for reference in describing the operation of reducing a residual capacity deviation between the plurality of battery modules by the wireless battery management system according to still another embodiment of the present disclosure.

Referring to FIG. 6, at the time point $t_{21}$, the high-level control unit 1 outputs an operation stop command to the master BMS 200. At the time point $t_{22}$, the master BMS 200 wirelessly transmits a first switching signal to the plurality of slave BMSs 100-1~100-3 in the active mode in response to the operation stop command. Because all the first to third slave BMSs 100-1~100-3 operate in the active mode, they may receive the first switching signal normally even though the master BMS 200 transmits the first switching signal only once. From the time point $t_{23}$, the first to third slave BMSs 100-1~100-3 may operate in the sleep mode in response to the first switching signal.

Meanwhile, in response to the operation stop command, the master BMS 200 may set the slave BMS 100-1 coupled to the battery module 20-1 having the highest SOC among the plurality of battery modules 20-1~20-3 as a representative slave BMS, and generate a setting command for assigning the representative slave BMS.

Before the time point $t_{23}$ (for example, $t_{22}$), the master BMS 200 may set the scan cycle and the scan duration of each of the first to third slave BMSs 100-1~100-3 by wirelessly transmitting a control signal including the setting command.

The first slave BMS 100-1 may check that the first slave BMS 100-1 was set as the representative slave BMS among the first to third slave BMSs 100-1~100-3 based on the setting command included in the control signal.

Between the time point $t_{22}$ and the time point $t_{23}$, the first slave BMS 100-1 set as the representative slave BMS may output a sync signal to the other slave BMSs 100-2, 100-3. The time point $t_{24}$ may be the time point when the first rising edge of a scanning pulse signal 601 to be output by the representative slave BMS will occur. The sync signal may be a signal for inducing the rising edges of scanning pulse signals 602, 603 of the other slave BMSs 100-2, 100-3 at the same time point as the time point $t_{24}$ when the first rising edge of a scanning pulse signal 601 of the first slave BMS 100-1 will take place.

Optionally, even after the time point $t_{24}$, the first slave BMS 100-1 set as the representative slave BMS may wirelessly transmit an auxiliary sync signal indicating the time point when its rising edge will take place periodically to the other slave BMSs 100-2, 100-3.

From the time point $t_{24}$, the slave control unit 140 of the first slave BMS 100-1 outputs the first scanning pulse signal 601 to the slave communication circuit 122. The first scanning pulse signal 601 is defined by a first scan cycle $T_{21}$ and a first scan duration $D_{21}$. From the time point $t_{24}$, the slave control unit 140 of the second slave BMS 100-2 outputs the second scanning pulse signal 602 to the slave communication circuit 122 according to the sync signal. The second scanning pulse signal 602 is defined by a second scan cycle $T_{22}$ and a second scan duration $D_{22}$. From the time point $t_{24}$, the slave control unit 140 of the third slave BMS 100-3 outputs the third scanning pulse signal 603 to the slave communication circuit 122 according to the sync signal. The third scanning pulse signal 603 is defined by a third scan cycle $T_{23}$ and a third scan duration $D_{23}$. It can be seen from FIG. 6 that the rising edges of the first to third scanning pulse signals 601, 602, 603 are synchronized at the same time point $t_{24}$.

Assume that the first to third scan cycles $T_{21}$, $T_{22}$, $T_{23}$ and the first to third scan durations $D_{21}$, $D_{22}$, $D_{23}$ respectively set to the first to third slave BMSs 100-1~100-3 by the master BMS 200 are $D_{21}=D_{22}=D_{23}$, $T_{22}=2\times T_{21}$, $T_{23}=3\times T_{21}$.

In this case, the first slave BMS 100-1 uses more energy in scanning the second switching signal than the second and third slave BMSs 100-2, 100-3. As a result, similar to the embodiment described above with reference to FIG. 4, the SOC of the first battery module 20-1 in which the first slave BMS 100-1 is installed decreases faster than the SOC of the second and third battery modules 20-2, 20-3. Additionally, the SOC of the second battery module 20-2 in which the second slave BMS 100-2 is installed decreases faster than the SOC of the third battery module 20-3.

At the time point $t_{25}$ when the first to third slave BMSs 100-1~100-3 are scanning the presence of the second switching signal using the first to third scanning pulse signals 601, 602, 603, the high-level control unit 1 outputs an operation start command to the master BMS 200.

In response to the operation start command, from the time point $t_{26}$, the master BMS 200 may wirelessly transmit the second switching signal in each preset cycle $P_{21}$.

At the time point $t_{26}$ when the second switching signal is wirelessly transmitted at the first time, the first and second scanning pulse signals 601, 602 have a high level, and thus the first and second slave BMSs 100-1, 100-2 succeed in scanning the second switching signal earlier than the third slave BMS 100-3.

Accordingly, from the time point $t_{26}$, each of the first and second slave BMSs 100-1, 100-2 switches from the sleep mode to the active mode and operates in the active mode.

Meanwhile, at the time point $t_{27}$ where a delay time $R_{21}$ corresponding to the ID of the first slave BMS 100-1 has elapsed since the time point $t_{26}$, the first slave BMS 100-1 wirelessly transmits a response signal notifying that the scanning of the second switching signal has succeeded to the master BMS 200. Additionally, at the time point $t_{28}$ where a delay time $R_{22}$ corresponding to the ID of the second slave BMS 100-2 has elapsed since the time point $t_{26}$, the second slave BMS 100-2 wirelessly transmits a response signal notifying that the scanning of the second switching signal has succeeded to the master BMS 200.

Now, only the third slave BMS 100-3 stays in sleep mode. However, dissimilar to the embodiments described above with reference to FIGS. 4 and 5, even though the master BMS 200 receives the response signal from the first and second slave BMSs 100-1, 100-2, the master BMS 200 may not shorten the preset cycle $P_{21}$. It is because the rising edges of the first to third scanning pulse signals 601, 602, 603 are synchronized and the master BMS 200 already knows information about the scanning pulse signal of the first slave BMS 100-1.

Accordingly, at the time point $t_{29}$ where the preset cycle $P_{21}$ has elapsed since the time point $t_{26}$ when the master BMS 200 transmitted the second switching signal last, the master BMS 200 wirelessly transmits the second switching signal. At the time point $t_{29}$, the third scanning pulse signal 603 has a high level, and thus the third slave BMS 100-3 may succeed in scanning the second switching signal. Accordingly, at the time point $t_{30}$ where a delay time Rai corresponding to the ID of the third slave BMS 100-3 has elapsed since the time point $t_{29}$, the third slave BMS 100-3 wirelessly transmits a response signal notifying that the scanning of the second switching signal has succeeded to the master BMS 200.

When the master BMS 200 wirelessly receives the response signal from all the slave BMSs 100-1~100-3 included in the wireless battery management system 30, the master BMS 200 may stop the wireless transmission of the second switching signal.

Figure 7:
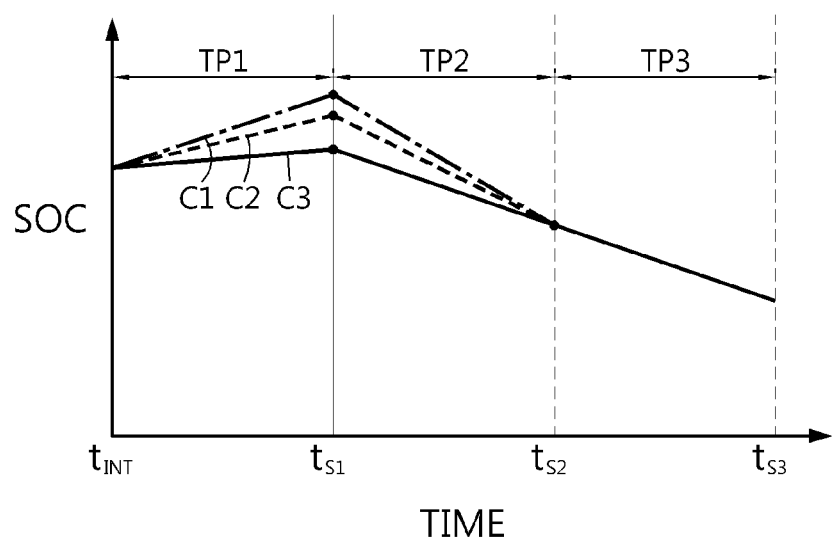
FIG. 7 is a graph showing the process of reducing a residual capacity deviation between a plurality of battery modules by a wireless battery management system according to an embodiment of the present disclosure.

FIG. 7 is a graph showing the process of reducing a residual capacity deviation between the plurality of battery modules 20-1~20-3 by the wireless battery management system according to an embodiment of the present disclosure.

Referring to FIG. 7, a first time period TP1, a second time period TP2 and a third time period TP3, and a first curve C1, a second curve C2 and a third curve C3 are seen. The first time period TP1 is the period of time from initial time point $t_{INT}$ to first switching time point $t_{S1}$, the second time period TP2 is the period of time from first switching time point $t_{S1}$ to second switching time point $t_{S2}$, and the third time period TP3 is the period of time from second switching time point $t_{S2}$ to third switching time point $t_{S3}$. Additionally, the first curve C1 indicates the SOC of the first battery module 20-1, the second curve C2 indicates the SOC of the second battery module 20-2, and the third curve C3 indicates the SOC of the first battery module 20-3.

During the first time period TP1, all the plurality of slave BMSs 100-1~100-3 operates in the active mode. The initial time point $t_{INT}$ refers to the time point at which the first to third battery modules 20-1~20-3 have the same SOC after balancing between the first to third battery modules 20-1~20-3 is completed. As it goes from the initial time point $t_{INT}$ to the first switching time point $t_{S1}$, a SOC deviation between the first to third battery modules 20-1~20-3 may gradually increase.

The first switching time point $t_{S1}$ may correspond to each of the time points $t_3$, $t_{13}$ and $t_{23}$ of FIGS. 4 to 6 respectively. That is, from the first switching time point $t_{S1}$, all the first to third slave BMSs 100-1~100-3 operate in the sleep mode. Because the SOC of the first battery module 20-1 is the highest and the SOC of the third battery module 20-3 is the lowest, the first slave BMS 100-1 scans the presence of the second switching signal using more energy than the second and third slave BMSs 100-2, 100-3 during the second time period TP2. Additionally, the second slave BMS 100-2 scans the presence of the second switching signal using more energy than the third slave BMS 100-3 during the second time period TP2. As a result, from the first switching time point $t_{S1}$ to the second switching time point $t_{S2}$, the rate of decrease in SOC of the first battery module 20-1>the rate of decrease in SOC of the second battery module 20-2>the rate of decrease in SOC of the third battery module 20-3.

The second switching time point $t_{S2}$ is the time point at which a SOC deviation between the first to third battery modules 20-1~20-3 falls within the preset error range. Thus, the third switching time point $t_{S3}$ may be the time point at which the first to third slave BMSs 100-1~100-3 are switched from the sleep mode to the active mode.

During the third time period TP3, the same scan cycle and the same scan duration may be set to the first to third slave BMSs 100-1~100-3. Accordingly, from the second switching time point $t_{S2}$ to the third switching time point $t_{S3}$, the rates of decrease in SOC of the first to third battery modules 20-1~20-3 may be equal. For example, the master BMS 200 may change the scan cycle and the scan duration set to each of the first and second slave BMSs 100-1, 100-2 to the scan cycle and the scan duration set to the third slave BMS 100-3.

The embodiments of the present disclosure described hereinabove are not implemented only through the apparatus and method, and may be implemented through programs that realize functions corresponding to the configurations of the embodiments of the present disclosure or recording media having the programs recorded thereon, and this implementation may be easily achieved by those skilled in the art from the disclosure of the embodiments previously described.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

Additionally, many substitutions, modifications and changes may be made to the present disclosure described hereinabove by those skilled in the art without departing from the technical aspects of the present disclosure, and the present disclosure is not limited to the above-described embodiments and the accompanying drawings, and each embodiment may be selectively combined in part or in whole to allow various modifications.

What is claimed is:

1. A wireless battery management system comprising:
    a plurality of slave battery management system (BMSs) coupled to a plurality of battery modules in one-to-one correspondence, each slave BMS operating in an active mode and a sleep mode using power supplied from the battery module to which the slave BMS is coupled, and, in the active mode, configured to wirelessly transmit a detection signal indicating a state of the battery module to which the slave BMS is coupled; and
    a master BMS configured to:
    wirelessly receive the detection signal from each of the plurality of slave BMSs,
    and
    calculate a state of charge (SOC) of each of the plurality of battery modules based on the detection signal, and set a scan cycle for each of the plurality of slave BMSs of scanning the master BMS based on the SOC of each of the plurality of battery modules to switch from the sleep mode to the active mode and wirelessly transmit a control signal to each of the plurality of slave BMSs, the control signal including a wireless balancing command indicating the scan cycle set for each of the plurality of slave BMSs.

2. The wireless battery management system according to claim 1, wherein when the master BMS receives an operation stop command from a high-level controller, the master BMS is configured to wirelessly transmit a first switching signal for inducing switching from the active mode to the sleep mode to the plurality of slave BMSs.

3. The wireless battery management system according to claim 1, wherein when the master BMS receives an operation start command from a high-level controller, the master BMS is configured to wirelessly transmit a second switching signal for inducing switching from the sleep mode to the active mode to the plurality of slave BMSs in a preset cycle.

4. The wireless battery management system according to claim 3, wherein the master BMS is configured to set a scan duration for each of the plurality of slave BMSs based on the detection signal, and
    wherein each of the plurality of slave BMS is configured to wirelessly scan the second switching signal in the sleep mode using the power supplied from the battery module to which the slave BMS is coupled for the scan duration set for the slave BMS in each scan cycle set to the slave BMS based on the wireless balancing command included in the control signal.

5. The wireless battery management system according to claim 3, wherein each of the plurality of slave BMSs is configured to switch from the sleep mode to the active mode when the slave BMS succeeds in scanning the second switching signal in the sleep mode.

6. The wireless battery management system according to claim 3, wherein each of the plurality of slave BMSs is configured to wirelessly transmit a response signal to the master BMS when the slave BMS succeeds in scanning the second switching signal in the sleep mode, the response signal notifying that the slave BMS has succeeded in scanning the second switching signal.

7. The wireless battery management system according to claim 6, wherein each of the plurality of slave BMSs is configured to wirelessly transmit the response signal to the master BMS at a time point when a delay time corresponding to an ID allocated to the slave BMS has elapsed after the scanning of the second switching signal has succeeded.

8. The wireless battery management system according to claim 7, wherein each time the master BMS receives the response signal from each of the plurality of slave BMSs, the master BMS is configured to shorten the preset cycle by a predetermined value or a predetermined percentage.

9. The wireless battery management system according to claim 4, wherein the master BMS is configured to set the slave BMS coupled to the battery module having a highest SOC among the plurality of battery modules as a representative slave BMS, and wherein the control signal further includes a setting command for assigning the representative slave BMS.

10. The wireless battery management system according to claim 9, wherein in the sleep mode, the representative slave BMS is configured to generate a sync signal based on the setting command, and wirelessly transmit the sync signal to the other slave BMSs.

11. The wireless battery management system according to claim 1, wherein in response to a deviation in the SOC between the plurality of battery modules being in a preset error range, the master BMS is further configured to set a same scan cycle and a same scan duration to the plurality of slave BMSs.

12. A wireless battery management system comprising:
a plurality of slave battery management system (BMSs) coupled to a plurality of battery modules in one-to-one correspondence, each slave BMS operating in an active mode and a sleep mode using power supplied from the battery module to which the slave BMS is coupled, and, in the active mode, configured to wirelessly transmit a detection signal indicating a state of the battery module to which the slave BMS is coupled; and
a master BMS configured to:
wirelessly receive the detection signal from each of the plurality of slave BMSs,
calculate a state of charge (SOC) of each of the plurality of battery modules based on the detection signal, and
in response to a deviation in the SOC between the plurality of battery modules being in a preset error range, set a same scan cycle and a same scan duration to the plurality of slave BMSs.

13. The wireless battery management system according to claim 12, wherein the master BMS is configured to set the scan cycle and the scan duration for each of the plurality of slave BMSs of scanning the master BMS for a signal to switch from the sleep mode to the active mode, based on the detection signal, and wirelessly transmit a control signal to each of the plurality of slave BMSs, the control signal including a wireless balancing command indicating the scan cycle and the scan duration set for each of the plurality of slave BMSs.

14. The wireless battery management system according to claim 13, wherein when the master BMS receives an operation start command from a high-level controller, the master BMS is configured to wirelessly transmit a switching signal for inducing switching from the sleep mode to the active mode to the plurality of slave BMSs in a preset cycle.

15. The wireless battery management system according to claim 14, wherein each of the plurality of slave BMS is configured to wirelessly scan the switching signal in the sleep mode using the power supplied from the battery module to which the slave BMS is coupled for the scan duration set for the slave BMS in each scan cycle set to the slave BMS based on the wireless balancing command included in the control signal.

16. The wireless battery management system according to claim 14, wherein each of the plurality of slave BMSs is configured to switch from the sleep mode to the active mode and wirelessly transmit a response signal to the master BMS notifying that the slave BMS has succeeded in scanning the second switching signal, when the slave BMS succeeds in scanning the switching signal in the sleep mode.

17. The wireless battery management system according to claim 16, wherein each of the plurality of slave BMSs is configured to wirelessly transmit the response signal to the master BMS at a time point when a delay time corresponding to an ID allocated to the slave BMS has elapsed after the scanning of the switching signal has succeeded.

18. The wireless battery management system according to claim 17, wherein each time the master BMS receives the response signal from each of the plurality of slave BMSs, the master BMS is configured to shorten the preset cycle by a predetermined value or a predetermined percentage.

19. The wireless battery management system according to claim 18, wherein the master BMS is configured to set the slave BMS coupled to the battery module having a highest SOC among the plurality of battery modules as a representative slave BMS.

20. The wireless battery management system according to claim 19, wherein in the sleep mode, the representative slave BMS is configured to generate a sync signal and wirelessly transmit the sync signal to the other slave BMSs.

* * * * *